Patented Sept. 11, 1934

1,973,341

UNITED STATES PATENT OFFICE 1,973,341

WELDING PROCESS

Harry S. George, Massapequa, N. Y., assignor to The Linde Air Products Company, a corporation of Ohio No Drawing. Application July 3, 1930, Serial No. 465,779

30 Claims. (Cl. 113—112)

This invention relates to a process of welding fabricated structural steel and iron members such as steel plates, steel pipe sections, rolled or pressed steel shapes, and the like, by producing a seam of ferrous metal along the contiguous edges of such members. Such members usually consist of low or medium carbon steels or, recently and to an increasing extent, of steels of relatively low alloy content, such as those containing up to about 1.50% manganese, so-called silico-manganese steels, and so forth.

Essentially and fundamentally, my invention takes advantage of several functions of carbon in ways that have not heretofore been utilized in connection with such welding. These functions of carbon operate to their fullest extent in a non-oxidizing atmosphere. In the preferred method of practicing this invention, the carbon and the non-oxidizing atmosphere are both provided by acetylene but they may be supplied otherwise. The application of the carbon may or may not be coincident with the welding operation but is preferably integrated with it and the welding is preferably performed in a non-oxidizing atmosphere.

Among the functions and behaviors of carbon utilized in this invention are the following: (1) It reacts with iron oxide to form iron and carbon monoxide; (2) it is soluble in iron and is rapidly absorbed by white hot iron; (3) it lowers the melting point of the resulting iron-carbon alloy; (4) it widens the freezing range of the iron-carbon mixture; and (5) it protects other alloying ingredients especially in conjunction with a reducing atmosphere. Several ways of utilizing these effects of carbon will be described and, although they are all considered to be within the scope of this invention, they are not all equally desirable, but they will serve to illustrate and explain the improved process of welding.

The so-called neutral oxy-acetylene flame has heretofore been standard and universally prescribed for making autogenous gas-welded joints between structural steel members such as structural shapes, plates, pipe sections and the like, wherein the usual practice is to apply such neutral flame to melt the contiguous edges of the members to be joined and to fill the space between the molten surfaces with metal melted from a steel rod or one containing alloying ingredients. This neutral flame is such an adjustment of the proportions of supplied oxygen and acetylene as to produce the maximum temperature at the tip of the welding cone of the oxy-acetylene flame.

This proportion amounts approximately to 104 parts of supplied oxygen to 100 parts of acetylene, by volume. The adjustment usually is approximately determined by the appearance of the flame, for when more acetylene than the above amount is supplied to the welding tip a "feather" or intermediate cone begins to appear at the end of the white inner cone and increases in length as the excess of acetylene increases. This so-called "neutral" flame is actually oxidizing in its effect on the base metal, and it tends to become more oxidizing during welding, which renders its so-called neutral condition difficult to maintain.

The usual procedure in making a butt weld between two plates, for example, has been to bevel the plate edges to be joined to an angle of about 45° and set them approximately parallel and almost touching. A "neutral" welding flame is then applied to deeply melt the walls of the 90° V shaped groove and to fill the latter with molten metal from a welding rod. The welder aims to prevent the advance of the puddle of molten metal along the groove faster than the plate or base metal is deeply melted by the welding flame. He does this by manipulating both the welding torch and the welding rod, the end of the latter being held in the puddle.

In autogenously welding structural steel members particularly, the oxidizing character of the so-called neutral flame is the source of various disadvantages and objectionable results, among which are the following:

(1) In welding with the so-called neutral flame, a considerable degree of superheating above the melting point is necessary in order to impart enough fluidity to the metal to float out the particles of oxide produced, for if they are trapped in the solidifying weld they become objectionable, non-metallic discontinuities, weakening the weld. Superheating the metal too much above its melting point leads to excessive absorption of gas with subsequent evolution of the same when the metal again cools to its freezing point. Since the top surface cools faster than the inside of the puddle, some of this gas is trapped, forming "blowholes". An excessive temperature also promotes oxidation in the deposited metal and along the walls of the V groove as the welding advances and heats the base metal to a high temperature.

(2) The formation of laps, which are caused by molten metal from the puddle flowing over unmelted base metal. When this happens, the thin film of oxide on the unmelted base metal prevents a sound autogenous weld between the parts.

(3) In making a single V weld with the neutral flame, it is necessary to melt the points of the beveled edges which usually allows the metal to run through; on the other hand, if these points are not melted, insufficient penetration generally results and a more or less unwelded oxide-filled seam is left at the bottom of the V. Both of these are common occurrences when welding with the so-called neutral flame and are decidedly objectionable in most work.

(4) The alloying ingredients in the welding rod are depleted and the carbon content is reduced to an undesirable extent. Two objectionable effects of thus burning out the alloying ingredients including the carbon are to raise the melting point of the filler metal and to narrow its freezing range.

In the autogenous welding of structural members (consisting of low or medium carbon steels) with the neutral oxyacetylene flame, any variation of the "neutral" adjustment either to the oxidizing or excess acetylene side has been considered bad practice. I have found that it requires an excess of acetylene amounting to about 6% to 10% over the proportion of acetylene in the so-called neutral flame to produce what, in its effect on the filler metal, is really a more neutral condition. That is to say, on the basis of its effect on the filler metal, more nearly neutral conditions with a single flame are obtained when the volume of supplied oxygen is to the volume of acetylene approximately as 97 is to 100. With such a flame, the carbon and other ingredients of the steel remain practically unoxidized and unchanged in quantity. In the present specification, for the sake of conformity with usage, the flame will be designated according to its appearance, i. e., "neutral" when the "feather" has just disappeared from the white inner cone, and "excess acetylene" when a "feather" or a "bushy feather" extends beyond said inner cone.

The chief objective of the present invention is to cause the walls of the groove between the members to be welded to absorb carbon as a preparation for receiving the filler metal. This may be done before welding, as by case-carburizing, or by a preliminary superficial melting of the surfaces with an excess acetylene flame, but in the preferred method of practicing the invention the carbon absorption is integrated with the welding operation by utilizing what, according to the above definition, is an excess acetylene flame.

While excellent welds have been made with a single flame, according to the present invention, when the volumetric ratio of the oxygen to the acetylene is approximately as 97 to 100, the amount of excess acetylene used may have a comparatively wide latitude. Generally speaking and based on a visible determination, a properly adjusted single flame may vary from a point where the intermediate "feather" has just appeared, to a point where said "feather" has become a "brush" about once to three times as long as the white inner cone, measuring from the end of said cone. However, no single adjustment for excess acetylene satisfies all requirements because different sizes of single-flame tips may be used; a plurality of tips may be used as in multiple-flame welding; and the manipulation of the flame or flames (the direction, point of application and movement) may vary with different welders. In practice, the simplest way now known to me of defining the limits of the amount of excess acetylene suitable in practically all cases depends upon certain visible and readily discernible characteristics of the welding operation. Sufficient excess acetylene is generally being used when the unwelded surface a short distance ahead of the weld spontaneously melts superficially, due to the absorption of carbon by the white hot metal and a lowering of the melting point of the surface layer so carburized. The "wet" appearance of the surface of the base metal for a short distance ahead of the weld is an indication to the welder that sufficient carbon is being absorbed by such surface and that the flame is properly adjusted. The welder can also readily determine by observation when too much excess acetylene is being used, for then the appearance of the sparks given off by the molten puddle during welding is the criterion,—the scintillating type of sparks becoming more numerous than an occasional one, such scintillating sparks being those characteristic of high carbon steel when touched to an emery wheel. Within these limits, precise adjustment is not essential, the desirable quantity of excess acetylene depending partly upon the torch tip,—its size and the number employed; partly on the size of weld; and somewhat on the manipulation, position of the flame, etc.

When butt welding boiler plate or steel pipe sections, for example, the procedure of beveling and assembling the parts to be joined may be substantially the same for the present process as for welding with the neutral flame, except that a much narrower groove, such as a 60° groove, may be used and the members may be set closer together; whereas a wider groove, a 90° V, is a practical necessity when welding with the neutral flame due to the difficulty of obtaining penetration to the bottom of the groove with the latter. Either the forward or the backward style of welding may be followed, the latter being preferable and particularly advantageous in conjunction with this process when hand welding with a single flame produced by the type of welding torch now available. A welding rod, when and as now used in connection with this process, may in some instances be held almost vertically to the work but is preferably held at a sharp angle thereto and inclined away from the torch, with its lower end in the puddle of molten steel in the groove, but the head of the welding torch is preferably held nearly horizontally or tilted only slightly from a horizontal position so that the flame therefrom is either practically horizontal or slightly inclined, say at an angle of about 30°, to the plane of the weld. The heat is directed chiefly against the end of the welding rod, and the base metal is preferably never raised to the melting point of steel by the torch flame. Ordinarily, the torch head and flame in neutral flame welding are inclined at an angle of about 60° to the plane of the weld. The present process affords a further simplification of welding technique in that special manipulation or transverse swinging movement of the torch and welding rod across the groove, as required in neutral flame welding, is unnecessary in excess acetylene welding. Instead, it is usually sufficient to move the practically horizontal torch head a short distance back and forth lengthwise of the groove and over the unwelded part thereof with the flame facing the rod, so that the excess acetylene flame will continuously impinge on and melt the filler rod at the proper rate and, when moved a slight distance away from the rod, will heat and carburize the adjacent surfaces of the groove. In some instances, this movement of the torch and flame is unnecessary, and the torch flame may be held stationary relatively to and a short distance in front of the weld and facing the filler rod. The face of the advancing weld reflects considerable heat and flame forwardly along the unwelded groove, which contributes in preparing the walls of the groove to receive and unite with the molten metal. The walls of the groove are also preheated by conduction. During the entire welding operation the puddle, the melting end of the rod, and the surfaces of the groove about to be welded, are of course enveloped and protected from oxidation by the excess acetylene flame.

When the welding operation raises the temperature of the adjacent groove surfaces to a white heat, the base metal a short distance ahead of the puddle can absorb carbon rapidly. The carbon may be applied either in the form of a suitable paste, a carburizing compound, or from contact with a graphite block, but the carbon is preferably derived from the welding flame itself by supplying a sufficient amount of excess acetylene to the flame for the purpose, and by manipulating the flame as described. In welding a V joint according to this invention, with an excess acetylene flame suitably manipulated, the surface skin of the base metal becomes molten for a short distance (about ½ inch when welding ⅜ inch steel plates) in front of the advancing puddle. This is because the base metal adjacent to the weld is heated to a white heat and rapidly absorbs carbon from the flame; thereupon the carbon by virtue of its effect in lowering the melting point of iron, causes the surface skin to spontaneously melt, i. e., to melt at a temperature substantially below the melting point of the original base metal. This action is facilitated and protected by the non-oxidizing atmosphere that is supplied by the excess acetylene flame when adjusted to yield the required amount of carbon for precarburizing the surface.

The advancing puddle flows out over the molten surfaces thus prepared in a manner very different from its behavior under the neutral flame. Unlike the procedure with the neutral flame, there is no necessity for melting down the base metal with the torch flame, because its surface melts spontaneously. Under the neutral flame, the surface adjacent to the puddle is "dry", the molten puddle does not "wet" it, but advances with a convex meniscus, like mercury on glass, or molten solder on unfluxed solid copper. But in the present method, the adjacent surface is "wet" usually about ½ inch in front of the molten puddle, which latter advances with a concave meniscus, like solder on properly prepared copper. After the molten metal of the puddle contacts with the molten carburized surfaces, the carbon distributes itself by diffusion and the base and filler metals form a perfect alloy and an autogenous joint. Inasmuch as the surfaces of the groove are preferably only superficially melted, the original shape of these surfaces remains unchanged in the finished joint, and the contacting surfaces, between two members joined directly or between such members and interposed filler metal, are free from slag and oxide to an extent discernible microscopically as marking or defining the original surfaces. There is a gradual transition, physically and chemically, between the filler and base metals which is accomplished by diffusion after solidification rather than by fusion as in neutral flame welding. The heat effect penetration into the base metal with the present process is decidedly less than in neutral flame welding,—for example, when welding ⅜ inch plate with a so-called neutral flame the depth of the metal heated above the recrystallization point of steel is about ⅜ inch whereas in excess acetylene welding according to this process the average depth is not more than about ⅛ inch. In general, the structure of the base metal is changed to a depth at least one-half to one-third the depth to which it is changed by neutral flame welding, for the same size of members. Moreover, the heat effect in the base metal tapers or becomes shallower toward the bottom of the V or fillet.

The molten high carbon surface film reacts on its frontier with the oxide film which is present even on mechanically clean surfaces. The reaction is denoted by a slight frothing, caused by the escaping gaseous product of the reaction which is completed at once and leaves the surface free from oxide and ready for union with the molten metal. This occurrence obviates the necessity of floating out the surface oxide, as required in neutral flame welding, and the film form of inclusion is substantially eliminated, as are also the other forms of microscopically visible and invisible inclusions. Since the surface of the base metal is free from oxide and melts below its original melting point, the filler metal can be applied at a much lower temperature than with the neutral flame, whereby gas absorption is substantially eliminated and blowholes are prevented. Greater welding speeds are attainable with the excess acetylene flame due to the formation of the high carbon surface film, for notwithstanding the lower temperature of the excess acetylene flame, the welding progresses faster because the base metal does not require direct and deep melting and because the filler metal does not need to be heated to as high a temperature as with the neutral flame. As a consequence, large savings in time and gases are attained.

Among other features of the present process which contribute to more expeditious and economical welding are: there are no oxides to float out; the welding rod is melted more rapidly; less skill and manipulation are required; less heat per unit area is required; more heat per unit area can be applied; and a narrower groove may be effectively utilized. In the present method, a torch tip having a much larger orifice than is practicable in neutral flame welding can be used in welding a given thickness of base metal, mainly because of the lesser degree of skill and manipulation required and the greater speed attainable. A greater speed results even from using the same size torch tip, which decreases the amount of heat expended per linear foot of weld or per pound of melted metal. This increased speed in turn permits the utilization of a tip having a larger orifice, while still maintaining excellent weld quality. I am also able to use a welding rod of considerably greater diameter than is feasible in neutral flame welding (for the same thickness of base metal), thereby facilitating welding and allowing the heat to be applied more effectively to the rod. Moreover, the alloying constituents, such as carbon, manganese, silicon, etc., in the welding metal are not diminished; consequently the melting point of the steel is not raised nor its freezing range narrowed. The metal is not only deoxidized by the acetylene but oxidation is prevented by reason of the blanket of reducing gas enveloping the lower end of the welding rod, the molten metal and adjacent areas of the members being welded.

The following data obtained from a number of comparative tests of operating speeds, gas consumption and quantity of welding rod deposited, illustrate the nature of the economies obtainable with the present invention in hand welding a single V seam between ⅜ inch steel plates with a single flame.

|  | Type of flame | |
|---|---|---|
|  | Neutral | Excess acetylene |
| Welding speed: | | |
| Feet per hour | 4–6 | 12–17 |
| Lb. rod melted per hour | 2–3 | 6–8 |
| Gas consumption: | | |
| Oxygen—cu. ft. per lb. rod melted | 11.7 | 8.3 |
| Acetylene—cu. ft. per lb. rod melted | 11.4 | 8.6 |

In connection with the foregoing table, it may be stated that the data for the neutral flame welding were obtained by using as large a flame as can be safely handled on the given thickness of members, namely one supplied by an Oxweld No. 10 tip having an orifice .098 inch in diameter and consuming about 36 cubic feet of oxygen per hour and about 34.3 cubic feet of acetylene per hour; whereas the data for the excess acetylene flame welding were obtained by using the next largest size tip, an Oxweld No. 12 tip having an orifice .116 inch in diameter and consuming about 65 cubic feet of oxygen and about 66 cubic feet of acetylene, respectively, per hour. It will be understood that if, in an attempt to gain greater speed, a larger size tip is used with a neutral flame under the given conditions, welds of inferior quality occur even where great skill is exercised; whereas the quality of the welds made with the faster excess acetylene flame is better than that of the best neutral flame welds and requires less skill.

Since the oxide film on the base metal is eliminated by the molten film on the groove surface just ahead of the progressing weld, the formation of laps is prevented, especially at the bottom of a single V weld; moreover, the points of the beveled edges of the members to be united do not need to be melted by the torch flame to insure penetration and complete welding as with the neutral flame, hence the molten metal does not run through and form beads on the under side of the seam.

The action of the excess acetylene flame on the welding rod is also distinctly advantageous because the highly heated surface of the rod absorbs carbon from the flame, whereby it melts rapidly at a lower temperature than its normal melting point. In order to further accelerate the melting of the rod and the welding operation as a whole, I may preheat either the rod or the work or both and thereby advantageously supply additional heat for the welding operation. Such preheating of the rod may be accomplished in various ways, as by utilizing a multiple tip welding torch, one tip of which delivers a heating flame (with or without excess acetylene) against the rod a short distance from the melting end thereof, the other tip or tips of the torch delivering the excess acetylene welding heat to the groove and puddle; or I may deflect heat from an excess acetylene welding flame upwardly along the rod and thereby preheat the latter. While the chemical composition and alloying ingredients of a steel welding rod adapted for use in the present process may vary considerably, I have found that some rod compositions are more suitable than others but, generally speaking, a satisfactory welding rod for this purpose may contain carbon from 0.05 to 0.50 per cent; manganese from 0.50 to 1.75 per cent; silicon from 0.20 to 1.50 per cent. For example, by the present process with a single excess acetylene flame, excellent welds have been made between structural steel members, such as ⅜ inch steel plates and pipe sections, using a steel welding rod containing carbon, about 0.11 to 0.20 per cent; manganese, about 0.90 to 1.15 per cent; silicon, about 0.32 to 0.42 per cent; sulphur and phosphorous, not over about 0.04 per cent each; the balance being principally iron.

Besides effecting the marked advantages already recited and decided economies in welding speed and gas consumption, the excess acetylene flame has less tendency to backfire than the neutral flame; prevents fouling or clogging of the tip orifice; drains no slag from the base metal into the weld, as occurs in neutral flame welding; and yields welds having a carbon content at least as great as that of the united members and superior in physical qualities to those obtainable with the neutral flame.

I am aware that an excess acetylene flame has been utilized to a limited extent for special purposes in the deposition of special alloys, such as depositing non-ferrous tungsten-chromium-cobalt alloy on steel surfaces to provide a wear-resistant coating; for welding special alloys such as chrome-iron and nickel-steel; and for treating high-carbon steel members such as steel rails. In such cases, however, the purpose as well as the procedure has been of quite a different nature,—the object in connection with depositing said non-ferrous alloy being to produce a comparatively thin wear-resistant layer on a metal surface, and in the other instances to provide a non-oxidizing atmosphere or to introduce additional carbon into the deposited weld metal or treated member to produce a higher carbon content and harder surface.

While the advantages and improved results herein set forth are most successfully attainable by means of an excess acetylene flame used both as a source of high-temperature heat and as a source of carbon in the manner described, in some instances I may employ a neutral oxyacetylene flame or an electric arc as the high-temperature heating means and apply an independent acetylene flame to the region heated by such arc or neutral flame and thereby materially improve the functioning of the latter when used in the welding of structural steel members. Under certain circumstances, for example where more than one gas flame is used, the total amount of acetylene in the heating flame as a whole may not exceed the volume of supplied oxygen, yet the several flames so used may nevertheless be applied in such a way that the contiguous edges to be welded will be carburized and welded in accordance with the present invention. Instead of a single excess acetylene flame as already described, I may jointly use independently adjusted oxy-acetylene flames or groups of flames; for example, either a so-called neutral flame or one containing a moderate excess of acetylene may be directed on the puddle chiefly for melting the filler metal and for heating purposes, and another flame containing a greater excess of acetylene may be directed on the contiguous edges of the base metal in front of the puddle chiefly to carburize the base metal. The last-mentioned carburizing flame or group of flames may consist of acetylene alone, but enough high pressure oxygen or other gas is preferably supplied therewith to impart sufficient velocity thereto to oppose the flame or flames comprising the melting group and cause the carburizing flame to impinge on the base metal just ahead of the molten puddle. With independently adjusted flames or groups of flames as described above it is possible to use a filler metal or welding rod consisting of nearly pure iron or of steel having a carbon content less than 0.10 per cent and in which the amount of other ingredients, such as manganese, silicon and nickel, is negligible.

It is to be understood that the improved process of the present invention may be utilized in both hand and machine welding, and is not only applicable to butt welding but also to lap welding and fillet welding, these classes of welding being included herein; since the term "contiguous", which designates the relation of the parts to be united, applies to overlapping as well as opposed edges or surfaces. It is preferred that the edges or surfaces to be joined shall first be cleaned of rust and mill scale, as by wire brushing, grinding, milling, or the like; for if of considerable thickness, the scale may prevent the absorption of carbon and otherwise interfere with the welding operation.

It is generally preferable to use a suitable welding rod as the filler metal to produce a seam in accordance with the present process, but I may wholly or partially dispense with such a rod in some instances and obtain the filler metal, wholly or partially, by melting down portions of the base metal and flowing the same onto adjacent properly prepared surfaces of the base metal, i. e., the base metal surfaces which have been modified by carburization and heated to a temperature which will melt such modified surfaces. In some instances also, I may produce a welded seam between structural members by simply bringing their surfaces, superficially molten as described, into direct contact. Hence, in all cases it is essential that the contiguous edges of the members be carburized and heated to a temperature which will melt such new or modified metal but preferably not the underlying base metal; and then either bring such molten or prepared surfaces into direct contact to thus weld them together, or to produce a weld union between them by melting a filler metal, from a welding rod or the members themselves, or from both the base metal and a welding rod, and flowing such molten filler metal onto the superficially molten surfaces of the base metal.

I claim:

1. Process of welding structural iron or steel members which comprises carburizing surface layers only of contiguous parts of such members and applying high-temperature heat to such surface layers to melt the carburized portions at a lower temperature than the melting point of the base metal of said members, and uniting such molten carburized portions.

2. Process of welding according to claim 1, in which said molten carburized portions are united by flowing molten filler metal thereon.

3. Process of welding according to claim 1, in which said molten carburized portions are brought into direct contact with each other in uniting them.

4. Process according to claim 1, in which said surface layers are carburized by means of acetylene.

5. Process according to claim 1, in which the carburization of said surface layers is integrated with the welding operation.

6. Process according to claim 1, in which the carburization and high-temperature heat are produced by oxy-acetylene source of heat in which the volume of supplied acetylene is in excess of the volume of supplied oxygen.

7. Process according to claim 1, in which the carburization and said high-temperature heat are produced by an oxy-acetylene flame in which the volume of supplied acetylene is in excess of the volume of supplied oxygen, such excess of acetylene being visibly indicated by a "feather" projecting from the end of the white inner cone of said flame, the length of said "feather" being not greater than about three times the length of said inner cone.

8. Process according to claim 1, in which the carburization and said high-temperature heat are derived from an oxy-acetylene flame in which the volume of supplied acetylene exceeds the volume of supplied oxygen, and said flame is pointed backward in a direction opposite to that of the advance of the welding.

9. Process according to claim 1, in which welding rod is melted by said heat and flowed onto said molten carburized portions to produce a seam uniting them, and the carburization and said high-temperature heat are derived from an oxy-acetylene flame wherein the volume of supplied acetylene exceeds the volume of supplied oxygen, and said flame is pointed backward in a direction opposite to the direction of advance of the welding and is supplied to the welding rod, the melted metal and the surfaces immediately ahead of the latter.

10. Process according to claim 1, in which the carburization and said high-temperature heat are produced by an oxy-acetylene flame wherein the volume of supplied acetylene exceeds the volume of supplied oxygen, and said flame is pointed backward in a direction opposite to the direction of advance of the welding and is moved a short distance lengthwise of the contiguous edges toward and away from the front of the completed weld.

11. Process according to claim 1, in which said high-temperature heat is produced by electricity.

12. Process of producing a welded seam uniting structural steel members which comprises carburizing the surfaces of contiguous edges of said members; applying high-temperature heat to said surfaces so that they will be progressively fused only superficially and at a lower temperature than the melting point of said members; and melting filler metal by such heat while progressively flowing the melted filler metal onto the superficially molten portion of said surfaces.

13. Process according to claim 12, in which said filler metal comprises a welding rod having a carbon content not exceeding that of medium carbon steel.

14. Process according to claim 12, in which said filler metal comprises a welding rod containing carbon and also containing substantial amounts of manganese and silicon.

15. Process according to claim 12, in which said contiguous edges are beveled and the groove between them is substantially a 60° V.

16. Process according to claim 12, in which said filler metal comprises a welding rod, and said welding rod or said members, or both, are preheated.

17. Process of producing a welded seam uniting edges of structural steel members which comprises beveling the edges to be united; placing such beveled edges in opposed relation to form a groove; progressively applying, to the surfaces of said groove, an oxy-acetylene flame in which the volume of supplied acetylene sufficiently exceeds the volume of supplied oxygen to cause successive portions of such highly heated surfaces to absorb carbon from said flame and spontaneously melt superficially at a lower temperature than the melting point of said members; and simultaneously melting filler metal in said flame and progressively depositing the filler metal so melted onto said surfaces as they become superficially molten in the progress of the welding operation.

18. Process according to claim 1, in which the carburization and high-temperature heat are produced by a plurality of flames.

19. Process according to claim 1, in which the carburization and high-temperature heat are produced by a plurality of oxy-acetylene flames which are independently adjustable to supply different proportions of oxygen and acetylene.

20. Process according to claim 1, in which the carburization and high-temperature heat are produced by two groups of flames in conjunction, each group consisting of one or more flames, one group being employed to carburize the surfaces of said contiguous parts, and the other group being employed chiefly to melt filler metal to unite such surfaces.

21. Process of welding which comprises carburizing surfaces of contiguous portions of metal members and applying high-temperature heat to such surfaces to melt the carburized portions at a lower temperature than the melting points of said members, and uniting such molten carburized portions; the carburization and high-temperature heat being produced by two groups of flames operating in conjunction, each group consisting of one or more flames; one group being employed to carburize the surfaces of said contiguous portions, and the other group being employed chiefly to melt filler metal to unite such surfaces; the first-mentioned group of flames being produced by oxygen and acetylene having the proportions of these gases so adjusted that the base metal adjacent the molten puddle becomes carburized superficially to a degree which causes such base metal to melt by virtue of the effect of carbon in lowering its melting point, and the second-mentioned group of flames being produced by oxygen and acetylene adjusted to a lesser proportion of acetylene to oxygen than the first mentioned group.

22. Process of welding which comprises carburizing surfaces of contiguous portions of metal members and applying high-temperature heat to such surfaces to melt the carburized portions at a lower temperature than the melting points of said members, and uniting such molten carburized portions; the carburization and high-temperature heat being produced by two groups of flames operating in conjunction, each group consisting of one or more flames; one group being employed to carburize the surfaces of said contiguous portions, and the other group being employed chiefly to melt filler metal to unite such surfaces; the first-mentioned group of flames being produced by oxygen and acetylene having the proportions of these gases so adjusted that the base metal adjacent the molten puddle becomes carburized superficially to a degree which causes such base metal to be melted by virtue of the effect of carbon in lowering its melting point, and the second-mentioned group of flames being produced by oxygen and acetylene adjusted to a lesser proportion of acetylene to oxygen than the first-mentioned group; the filler metal comprising either nearly pure iron or a steel having a carbon content less than 0.10 per cent and other ingredients of the filler metal such as manganese, silicon and nickel being negligible.

23. Process of welding which comprises carburizing surfaces of contiguous portions of metal members and applying high-temperature heat to such surfaces to melt the carburized portions at a lower temperature than the melting points of said members, and uniting such molten carburized portions; the carburization and high-temperature heat being produced by two groups of flames operating in conjunction, each group consisting of one or more flames; one group being employed to carburize the surfaces of said contiguous portions, and the other group being employed chiefly to melt filler metal to unite such surfaces; the first-mentioned group of flames being produced by oxygen and acetylene having the proportions of these gases so adjusted that the base metal adjacent the molten puddle becomes carburized superficially to a degree which causes such base metal to be melted by virtue of the effect of carbon in lowering its melting point, and the second-mentioned group of flames being produced by oxygen and acetylene adjusted to a lesser proportion of acetylene to oxygen than the first mentioned group; the filler metal having a composition approximately that of the base metal.

24. Process of welding metal members which comprises forming integral surface layers only of alloy on the contiguous edges or surfaces of said members, said alloy layers having a melting point substantially lower than that of the original base metal comprising said members; causing said alloy layers to melt at a temperature lower than the melting point of such base metal; and uniting such molten layers.

25. Structural steel members having their contiguous edges or surfaces united by a welded V or fillet joint in which the structure of the base metal has been changed by the welding to a depth not more than about one-half to one-third the depth to which it is changed by neutral flame welding, for the same thickness of members; and in which the heat effect produced by the welding tapers or becomes shallow toward the bottom of the V or fillet; and in which the original shape of said edges or surfaces remains substantially unchanged; and in which said edges or surfaces are free from oxide to an extent discernible microscopically as defining the original edges or surfaces.

26. Process of producing a welded seam uniting structural steel members which comprises: applying high-temperature heat to contiguous edges of said members, such heat being produced by an oxy-acetylene flame adapted to carburize such edges and then melt them superficially only; moving said flame lengthwise relatively to said seam while pointing the flame in a direction substantially opposite to the direction of advance of the welding; and melting filler metal during such movement and progressively flowing such melted filler metal onto such superficially melted edges as the welding advances.

27. Process of producing a welded seam uniting structural steel members which comprises beveling the edges to be united; placing such beveled edges in opposed relation to form a substantially V-shaped groove; applying an oxy-acetylene flame to the surfaces of said groove, said flame being adapted to carburize said surfaces and then melt them only superficially; moving said flame lengthwise relatively to said groove while pointing the flame in a direction opposite to the direction of advance of the welding; and melting a metal welding rod in said flame during such movement and flowing the molten rod metal into said groove and onto such superficially melted surfaces as the welding advances along said groove.

28. Process of welding which comprises simultaneously carburizing surfaces of contiguous portions of metal members and applying high-temperature heat to such surfaces to simultaneously melt the carburized portions at a lower temperature than the melting points of said members, and uniting such molten carburized portions.

29. Process of welding according to claim 28, in which an oxy-acetylene flame is employed both to carburize said surfaces and to melt the carburized surfaces.

30. Process of welding according to claim 28, in which said molten carburized portions are united by flowing molten filler metal thereon, an oxy-acetylene flame is employed as a source of high-temperature heat and is applied against said surfaces and against the filler metal to melt such filler metal while carburizing and melting said surfaces.

HARRY S. GEORGE.